(12) United States Patent
Dhanasekar et al.

(10) Patent No.: US 12,143,362 B2
(45) Date of Patent: Nov. 12, 2024

(54) CONTEXT-AWARE SERVICE QUERY FILTERING

(71) Applicant: VMWARE, INC., Palo Alto, CA (US)

(72) Inventors: Vasantha Kumar Dhanasekar, Pune (IN); Shirish Vijayvargiya, Pune (IN); Leena Shuklendu Soman, Pune (IN)

(73) Assignee: VMware LLC, Palo Alto, CA (US)

( * ) Notice: Subject to any disclaimer, the term of this patent is extended or adjusted under 35 U.S.C. 154(b) by 80 days.

(21) Appl. No.: 17/673,841

(22) Filed: Feb. 17, 2022

(65) Prior Publication Data
US 2023/0208810 A1    Jun. 29, 2023

(30) Foreign Application Priority Data
Dec. 23, 2021 (IN) .............................. 202141060246

(51) Int. Cl.
| G06F 21/00 | (2013.01) |
| H04L 9/40 | (2022.01) |
| G06F 9/455 | (2018.01) |
| G06F 9/50 | (2006.01) |
| G06F 21/56 | (2013.01) |

(52) U.S. Cl.
CPC ...... *H04L 63/0254* (2013.01); *H04L 63/1491* (2013.01); *H04L 63/205* (2013.01)

(58) Field of Classification Search
CPC ............. H04L 63/0254; H04L 63/1491; H04L 63/205; H04L 63/0227; H04L 63/1408; H04L 63/1416; H04L 63/1441; H04L 63/145

See application file for complete search history.

(56) References Cited

U.S. PATENT DOCUMENTS

| 2021/0021634 A1* | 1/2021 | Babakian ............ G06F 9/45558 |
| 2021/0194853 A1* | 6/2021 | Xiao ..................... H04L 43/028 |
| 2021/0314237 A1* | 10/2021 | Ogale ................... H04L 41/046 |

FOREIGN PATENT DOCUMENTS

| WO | WO-2019158915 A1 * | 8/2019 | ............. G06F 21/56 |

OTHER PUBLICATIONS

Zhouyu Bao, Yuqing Lan, Wenbo Wang; "Using Passive DNS to Detect Malicious Domain Name"; ACM; ICVISP 2019: Proceedings of the 3rd International Conference on Vision, Image and Signal Processing; Aug. 2019; Article No. 85; pp. 1-8 (Year: 2019).*

* cited by examiner

*Primary Examiner* — Mohammad W Reza
*Assistant Examiner* — Courtney D Fields
(74) *Attorney, Agent, or Firm* — King Intellectual Asset Management (57) ABSTRACT

Example methods and systems for a computer system to perform context-aware service query filtering are described. One example may involve a computer system intercepting a service query from a virtualized computing instance to pause forwarding of the service query towards a destination; and obtaining context information associated with an application running on the virtualized computing instance. In response to determination that the service query is a potential security threat based on the context information, service query filtering may be performed to inspect the service query for malicious activity. Otherwise, in response to determination that the service query is not a potential security threat based on the context information, the service query filtering may be skipped and the service query forwarded towards the destination.

21 Claims, 7 Drawing Sheets

CONTEXT-AWARE SERVICE QUERY FILTERING

RELATED APPLICATION

Benefit is claimed under 35 U.S.C. 119(a)-(d) to Foreign Application Serial No. 202141060246 filed in India entitled "CONTEXT-AWARE SERVICE QUERY FILTERING", on Dec. 23, 2021, by VMware, Inc., which is herein incorporated in its entirety by reference for all purposes.

BACKGROUND

Virtualization allows the abstraction and pooling of hardware resources to support virtual machines in a software-defined data center (SDDC). For example, through server virtualization, virtualized computing instances such as virtual machines (VMs) running different operating systems may be supported by the same physical machine (e.g., referred to as a "host"). Each VM is generally provisioned with virtual resources to run a guest operating system and applications. The virtual resources may include central processing unit (CPU) resources, memory resources, storage resources, network resources, etc. In practice, it is desirable to detect potential security threats that may affect the performance of hosts and VMs in the SDDC.

DETAILED DESCRIPTION

According to examples of the present disclosure, context-aware service query filtering may be implemented to strengthen data center security, particularly to improve defense against malware that relies on service queries to launch a malicious attack. One example may involve a computer system (e.g., host-A 110A in FIGS. 1-2) intercepting a service query from a virtualized computing instance (e.g., VM 131/132 in FIGS. 1-2) to pause forwarding of the service query towards a destination; and obtaining context information associated with an application (e.g., APP 141/142 in FIGS. 1-2) running on the virtualized computing instance.

In response to determination that the service query is a potential security threat based on the context information, service query filtering may be performed to inspect the service query for malicious activity. Otherwise, in response to determination that the service query is not a potential security threat based on the context information, the service query filtering may be skipped and the service query forwarded towards the destination. By performing selective filtering based on context information, examples of the present disclosure may reduce the processing load associated with service query filtering. Various examples will be discussed below using FIGS. 1-7.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 1:
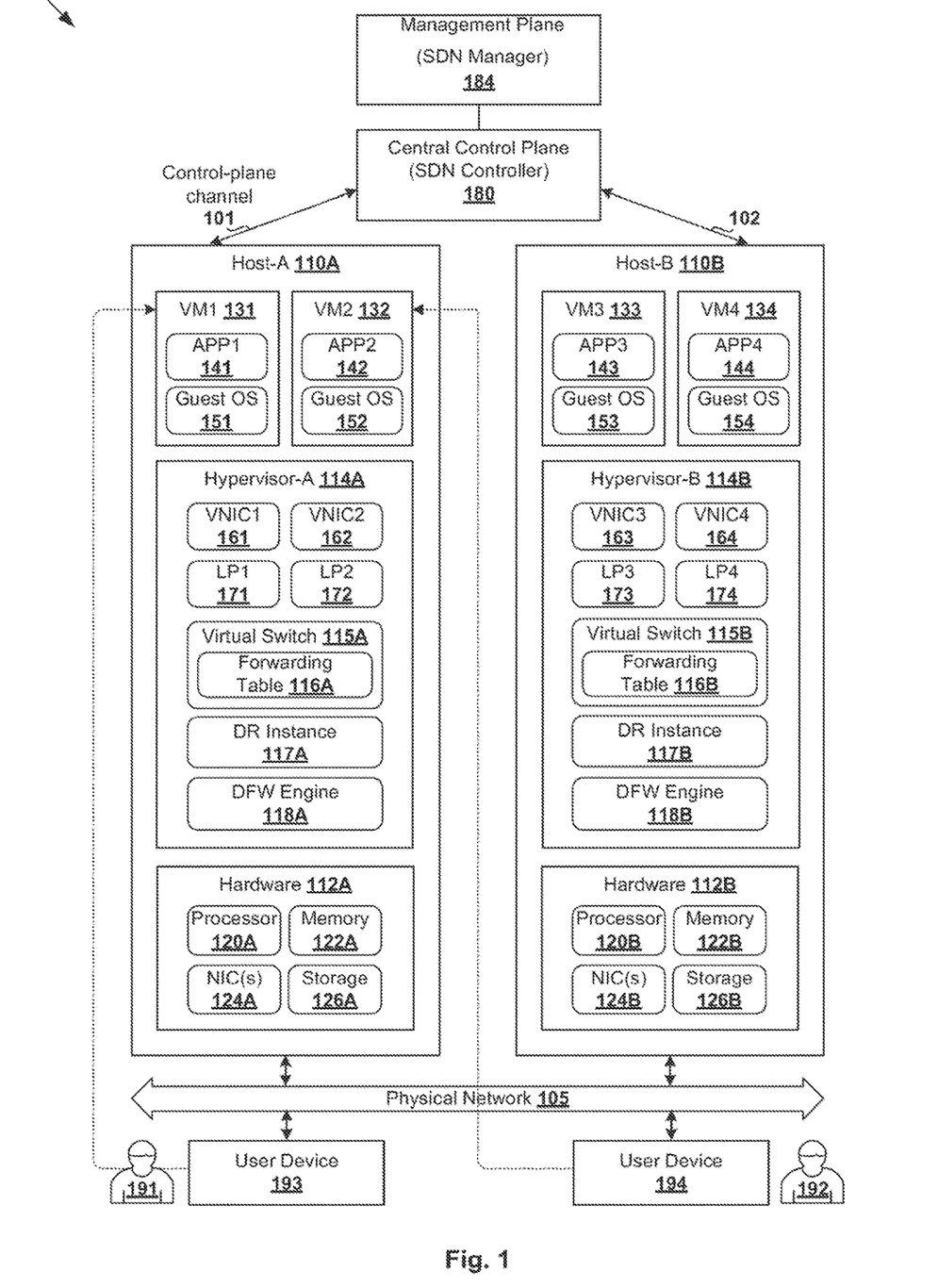
FIG. 1 is a schematic diagram illustrating an example software-defined networking (SDN) environment in which context-aware service query filtering may be performed.

FIG. 1 is a schematic diagram illustrating example software-defined networking (SDN) environment 100 in which context-aware service query filtering may be performed. It should be understood that, depending on the desired implementation, SDN environment 100 may include additional and/or alternative components than that shown in FIG. 1. Although the terms "first" and "second" are used to describe various elements, these elements should not be limited by these terms. These terms are used to distinguish one element from another. For example, a first element may be referred to as a second element, and vice versa.

SDN environment 100 includes multiple hosts 110A-B that are inter-connected via physical network 105. Each host 110A/110B may include suitable hardware 112A/112B and virtualization software (e.g., hypervisor-A 114A, hypervisor-B 114B) to support various VMs. For example, hosts 110A-B may support respective VMs 131-134. Hardware 112A/112B includes suitable physical components, such as central processing unit(s) (CPU(s)) or processor(s) 120A/120B; memory 122A/122B; physical network interface controllers (NICs) 124A/124B; and storage disk(s) 126A/126B, etc. In practice, SDN environment 100 may include any number of hosts (also known as a "host computers", "host devices", "physical servers", "server systems", "transport nodes," etc.), where each host may be supporting tens or hundreds of virtual machines (VMs).

Hypervisor 114A/114B maintains a mapping between underlying hardware 112A/112B and virtual resources allocated to respective VMs. Virtual resources are allocated to respective VMs 131-134 to support a guest operating system and application(s); see 141-144, 151-154. Any suitable processes or applications 141-144 may be implemented, such as user- or kernel-space applications labelled "APP1" to "APP4." For example, virtual resources may include virtual CPU, guest physical memory, virtual disk, virtual network interface controller (VNIC), etc. Hardware resources may be emulated using virtual machine monitors (VMMs). For example, VNICs 161-164 are virtual network adapters for respective VMs 131-134. Each VNIC may be emulated by a corresponding VMM (not shown) instantiated by hypervisor 114A/114B. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B implements virtual switch 115A/115B and logical distributed router (DR) instance 117A/117B to handle egress packets from, and ingress packets to, corresponding VMs. In SDN environment 100, logical switches and logical DRs may be implemented in a distributed manner and can span multiple hosts. For example, logical switches that provide logical layer-2 connectivity, i.e., an overlay network, may be implemented collectively by virtual switches 115A-B and represented internally using forwarding tables 116A-B at respective virtual switches 115A-B. Forwarding tables 116A-B may each include entries that collectively implement the respective logical switches. Further, logical DRs that provide logical layer-3 connectivity may be implemented collectively by DR instances 117A-B and represented internally using routing tables (not shown) at respective DR instances 117A-B. The routing tables may each include entries that collectively implement the respective logical DRs.

Packets may be received from, or sent to, each VM via an associated logical port. For example, logical switch ports 171-174 are associated with respective VMs 131-134. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-B in FIG. 1, whereas a "virtual switch" may refer generally to a software switch or software implementation of a physical switch. In practice, there is usually a one-to-one mapping between a logical port on a logical switch and a virtual port on virtual switch 115A/115B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

Through virtualization of networking services in SDN environment 100, logical networks (also referred to as overlay networks or logical overlay networks) may be provisioned, changed, stored, deleted and restored programmatically without having to reconfigure the underlying physical hardware architecture. A logical network may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts which may reside on different layer 2 physical networks. In the example in FIG. 1, VM1 131 on host-A 110A and VM3 133 on host-B 110B may be connected to the same logical switch and located on the same logical layer-2 segment, such as a segment with virtual network identifier (VNI)=6000.

SDN controller 180 and SDN manager 184 are example network management entities in SDN environment 100. One example of an SDN controller is the NSX controller component of VMware NSX® (available from VMware, Inc.) that operates on a central control plane. SDN controller 180 may be a member of a controller cluster (not shown for simplicity) that is configurable using SDN manager 184 operating on a management plane. Network management entity 180/184 may be implemented using physical machine(s), VM(s), or both. Logical switches, logical routers, and logical overlay networks may be configured using SDN controller 180, SDN manager 184, etc. To send or receive control information, a local control plane (LCP) agent (not shown) on host 110A/110B may interact with central control plane (CCP) module 182 at SDN controller 180 via control-plane channel 101/102.

Hosts 110A-B may also maintain data-plane connectivity with each other via physical network 105 to facilitate communication among VMs 131-134. Hypervisor 114A/114B may implement a virtual tunnel endpoint (VTEP) (not shown) to encapsulate and decapsulate packets with an outer header (also known as a tunnel header) identifying the relevant logical overlay network. For example in FIG. 1, hypervisor-A 114A implements a first VTEP associated with (IP address=IP-A, VTEP label=VTEP-A). Hypervisor-B 114B implements a second VTEP with (IP-B, VTEP-B). Encapsulated packets may be sent via an end-to-end, bi-directional communication path (known as a tunnel) between a pair of VTEPs over physical network 105.

Data Center Security

One of the challenges in SDN environment 100 is improving the overall data center security. To protect VMs 131-134 against security threats caused by unwanted packets, hypervisor 114A/114B may implement distributed firewall (DFW) engine 118A/118B to filter packets to and from associated VMs 131-134. For example, at host-A 110A, hypervisor-A 114A may implement DFW engine 118A to filter packets for VM1 131 and VM2 132. Using SDN manager 184 and SDN controller 180, firewall rules that are enforceable by DFW engine 118A/118B may be configured. In practice, packets may be filtered according to firewall rules at any point along the datapath from a source (e.g., VM1 131) to a physical NIC (e.g., 124A). In one embodiment, a filter component (not shown) may be incorporated into each VNIC 141-144 to enforce firewall rules configured for respective VMs 131-134. The filter components may be maintained by DFW engines 118A-B.

In practice, however, DFW engine 118A/118B might not be able to defend against all possible security threats. For example, micro-segmentation is generally implemented to reduce an attacker's ability to move laterally within a data center. In this case, a network administrator has to define firewall rules or security policy to allow or block certain TCP or UDP traffic in the data center. This approach may be inadequate against newer security threats, such as those that use evasive techniques to control VMs 131-134 remotely without getting detected using conventional firewall rules or security policy enforcement.

For example, sunburst attacks that rely on domain name system (DNS) tunneling mechanism might be launched by an attacker to control malware-infected applications, such as APP1 141 executing on VM1 131. With the support for anonymous hosting services without revealing the location or name information of the domain owner, it is relatively easy to set up a domain name and divert all subdomain requests to a private DNS server (i.e., rogue system). In particular, a malicious attacker may register a domain name (e.g., www.malwaresite.com) and divert all subdomain requests (e.g., xyz.malwaresite.com) to the private DNS server.

In general, subdomains may carry some critical information as a large domain request for which the server would give an address encoded reply. For example, a malware infecting APP1 141 running on VM1 131 might send a DNS query for subdomain name="cmdtoexecuteinwin10.malwaresite.com" to which the DNS server replies with IP address="1.1.1.1." The malware might configure and send a complex encoded DNS query to the private DNS server and act accordingly based on the resolved IP address. This kind of command and control response over DNS is not easily trackable using conventional firewall rules that are not capable of filtering DNS requests. In this case, there is a risk that data center security would be compromised, which is undesirable.

Context-Aware Service Query Filtering

According to examples of the present disclosure, context-aware service query filtering may be implemented to strengthen data center security. Unlike conventional approaches that rely on inadequate firewall rule enforcement, examples of the present disclosure may be implemented to improve defense against malware that relies on service queries to launch a malicious attack, such as sunburst attack based on DNS queries, etc. Further, using a "context-aware" approach, selective filtering may be performed based on context information associated with application(s). This reduces the amount of service query inspection required, which may be resource-intensive and time-consuming for DFW engine 118A/118B.

Throughout the present disclosure, the term "service query" may refer generally to any suitable request for a service from a destination according to a protocol. Examples include DNS query for a domain name resolution service, netBIOS name query, Link-Local Multicast Name Resolution (LLMNR) query, Peer Name Resolution Protocol (PNRP) query, InterPlanetary Name System (IPNS) query, etc. The term "malware" may be used as an umbrella term to cover hostile or intrusive software, including but not limited to botnets (to be discussed below), viruses, worms, Trojan horse programs, spyware, phishing, adware, riskware, rookits, spams, scareware, ransomware, or any combination thereof.

Figure 2:
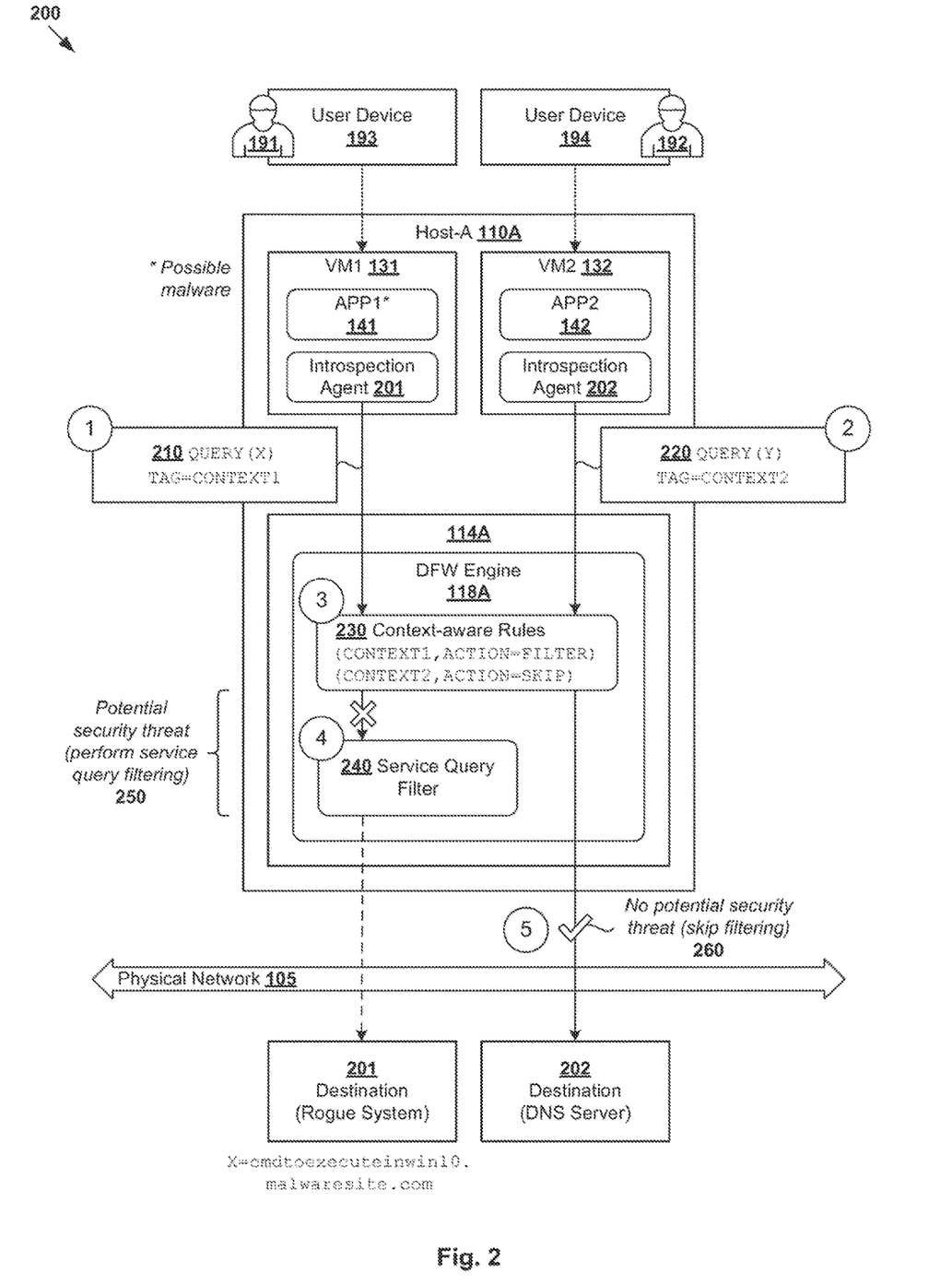
FIG. 2 is a schematic diagram illustrating an example context-aware service query filtering.
Figure 3:
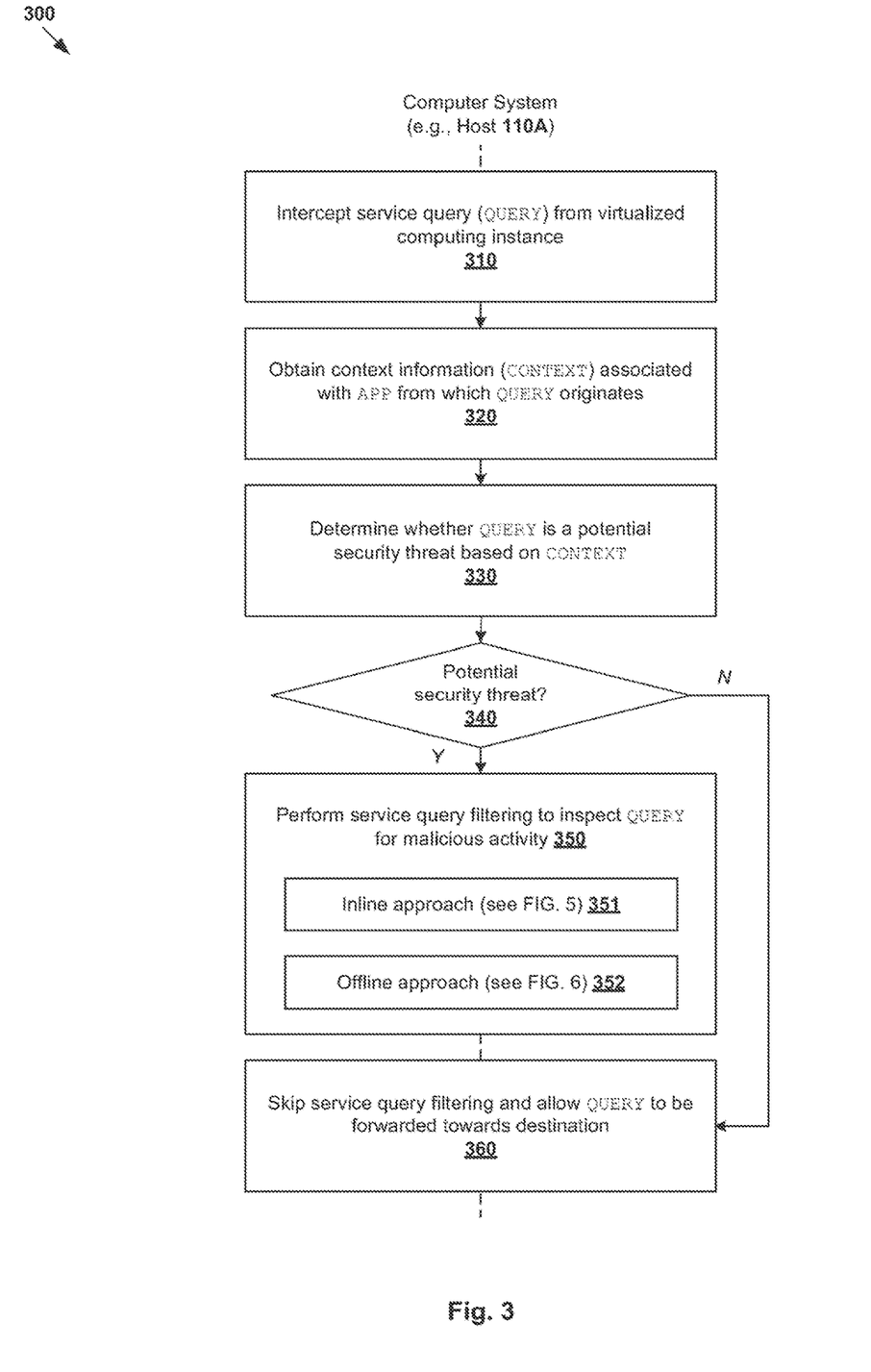
FIG. 3 is a flowchart of an example process for a computer system to perform context-aware service query filtering.

Some examples will be described below using FIG. 2 and FIG. 3. In particular, FIG. 2 is a schematic diagram illustrating example context-aware service query filtering 200, while FIG. 3 is a flowchart of example process 300 for a computer system to perform context-aware service query filtering. Example process 300 may include one or more operations, functions, or actions illustrated by one or more blocks, such as 310 to 360. The various blocks may be combined into fewer blocks, divided into additional blocks, and/or eliminated depending on the desired implementation. Examples of the present disclosure may be implemented by any suitable "computer system," such as host 110A/110B using DFW engine 118A/118B and a guest introspection agent (see 201/202 in FIG. 2) running on guest OS 151/152/153/154 of VM 131/132/133/134.

At 310 in FIG. 3, host-A 110A may intercept a service query from VM1 131 to pause (or temporarily block) the forwarding of the service query towards a destination. For example in FIG. 2, first service query 210 may be a DNS query that originates from APP1 141 running on VM1 131 for forwarding towards destination 201 (e.g., rogue DNS server) operated by a malicious attacker. Second service query 220 may be a DNS query that originates from APP2 142 running on VM2 132 for forwarding towards destination 202 (e.g., non-malicious DNS server).

At 320 in FIG. 3, host-A 110A may obtain context information associated with a process or application 141/142 from which service query 210/220 originates. The term "obtaining" may refer generally to retrieving or receiving context information, such as from a guest introspection agent running on a VM's guest OS. For example in FIG. 2, first service query 210 may include context information (see "CONTEXT1") that is collected by guest introspection agent 201 running on guest OS 151 of VM1 131. Similarly, second service query 220 may include context information (see "CONTEXT2") that is collected by guest introspection agent 202 running on guest OS 152 of VM1 132.

As used herein, the term "context information" may refer generally to information that is associated with an application from which a service query originates, and suitable for detecting potential security threat(s). Example context information may include (a) application information associated with application 141/142; (b) user information associated with user 191/192 operating VM 131/132 via user device 193/194; (c) hardware information associated with application 141/142 and/or user device 193/194; (d) software information associated with application 141/142 and/or user device 193/194; and (e) reputation information (e.g., collected by an antivirus agent) associated with application 141/142.

At 330 in FIG. 3, host-A 110A may determine whether service query 210/220 is a potential security threat based on the context information. At 340 and 350, in response to determination that service query 210/220 is a potential security threat, host-A 110A may perform service query filtering to inspect service query 210/220 for malicious activity. Otherwise, at 360, otherwise, host-A 110A may skip the service query filtering and allow forwarding of service query 210/220 towards the destination.

In practice, block 330 may involve DFW engine 118A applying context-aware rule(s) on service query 210/220. As used herein, a "context-aware rule" may refer generally to a matching rule specifying (a) context information to be matched to a query and (b) an action to be performed if there is a match. Any suitable context-aware rules may be defined based on context information associated with application 141/142. For example in FIG. 2, DFW engine 118A may apply context-aware rule(s) based on CONTEXT1 (e.g., application type=non-browser) in first service query 210. In response to determination that there is a potential security threat, service query filter 240 may further inspect first service query 210 for malicious activity. See 250 in FIG. 2.

In contrast, in response to determination that there is no potential security threat based on CONTEXT2 (e.g., application type=browser), service query filtering may be skipped and second service query 220 may be forwarded towards DNS server 202. As such, instead of filtering each and every query intercepted by DFW engine 118A, examples of the present disclosure may perform selective filtering based on the context information. This reduces the number of service queries that require further inspection using service query filtering, which may be resource-intensive and time-consuming as well as affect application performance.

As will be described further below, service query filtering at block 350 in FIG. 3 may be performed according to an inline approach, an offline approach, or a combination of both. According to the inline approach (see 351 in FIG. 3 and FIG. 5), service query filtering may be performed to allow or block forwarding of first service query 210 to destination 201. According to the offline approach (see 352 in FIG. 3 and FIG. 6), first service query 210 may be cached prior to performing service query filtering on a batch of multiple cached service queries. In this case, first service query 210 may be first forwarded towards destination 201, or a honeypot server (see 601 in FIG. 6), prior to performing the service query filtering in an offline manner. Both approaches will be discussed further using FIGS. 4-7 below.

Guest Introspection and Context Information

Figure 4:
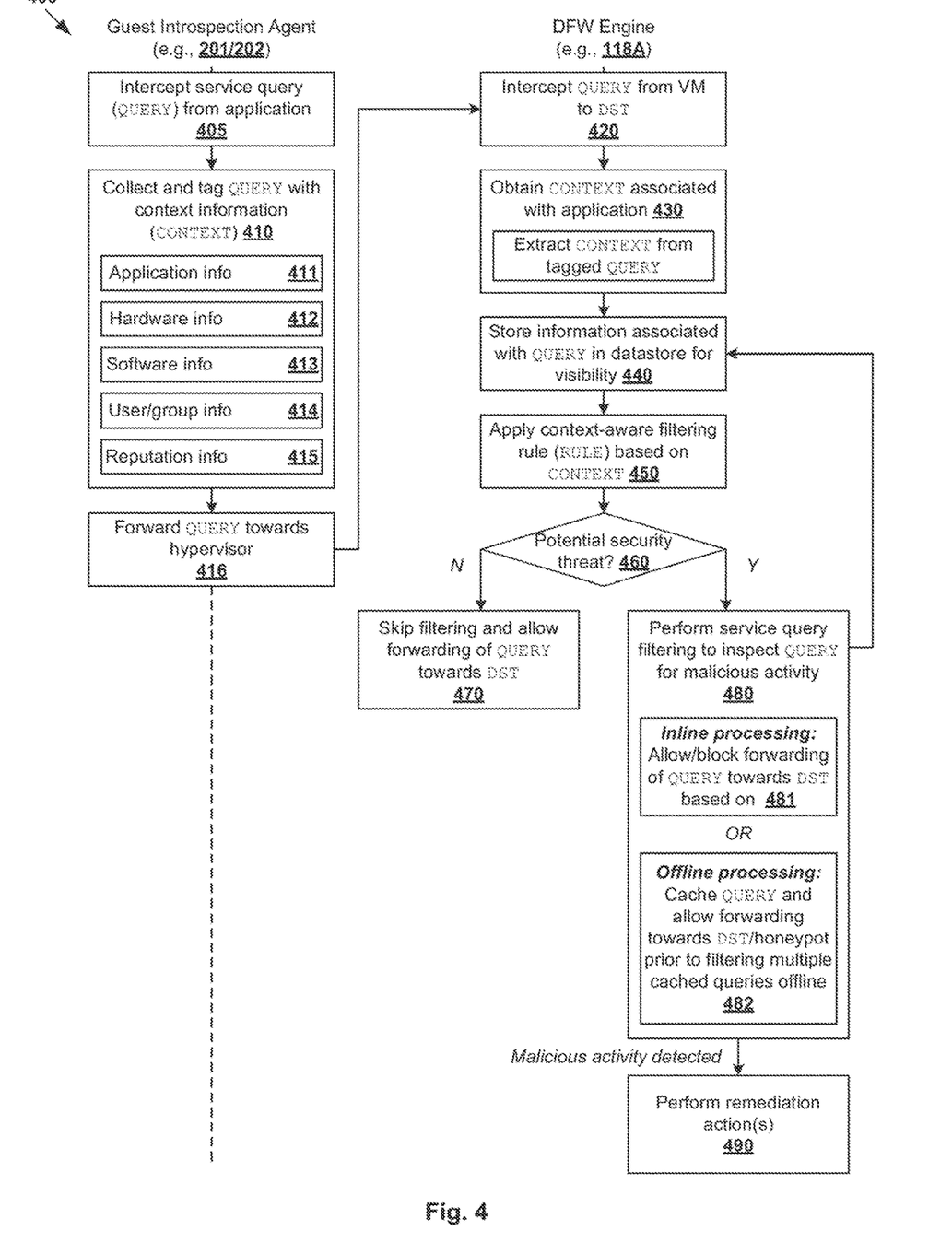
FIG. 4 is a flowchart of an example detailed process for a computer system to perform context-aware service query filtering.

FIG. 4 is a flowchart of example detailed process 400 for context-aware service query filtering in SDN environment 100. Example process 400 may include one or more operations, functions, or actions illustrated at 410 to 490. The various operations, functions or actions may be combined into fewer blocks, divided into additional blocks, and/or eliminated depending on the desired implementation. The example in FIG. 4 will be explained using FIG. 5, which is a schematic diagram illustrating first example 500 of context-aware service query filtering according to an inline approach.

At 405-410 in FIG. 4, in response to detecting a service query from application 141/142 running on VM 131/132, guest introspection agent 201/202 may collect and tag the service query with context information. Depending on the desired implementation, guest introspection agent 201/202 may intercept name resolution request calls using any suitable hooking techniques. Using Windows® (a registered trademark of Microsoft Corporation) operating system as an example, guest introspection agent 201/202 may hook name-related system calls such as "gethostbyname" and "getaddrinfo" winsock application interface programming (API) calls. The winsock namespace provider API that may be used for intercepting DNS calls made by applications 141-142. Similar techniques may be performed for other operating system(s) on guest OS 151/152.

Any suitable "context information" may be collected by guest introspection agent 201/202. One example is application information associated with application 141/142, such as application ID, name, type (e.g., browser and non-browser), version, etc. Another example is user information associated with user 191/192 operating VM 131/132 via user device 193/194, such as user ID, identity information, role, permission, etc. The context information may include hardware and/or software information associated with application 141/142 and/or user device 193/194, such as device type, location information, operating system, software version, list of frequently-used applications, jailbreak status, etc.

Alternatively or additionally, the context information may include reputation information associated with application 141/142 from an antivirus agent (not shown) running on VM 131/132. For example, based on information relating to known malware and executable(s), the antivirus agent may assign application 141/142 with a reputation score. In this case, a high reputation score (i.e., exceeding a threshold) may be assigned to indicate a trusted state, while a low reputation score (i.e., below the threshold) may indicate an untrusted state.

Figure 5:
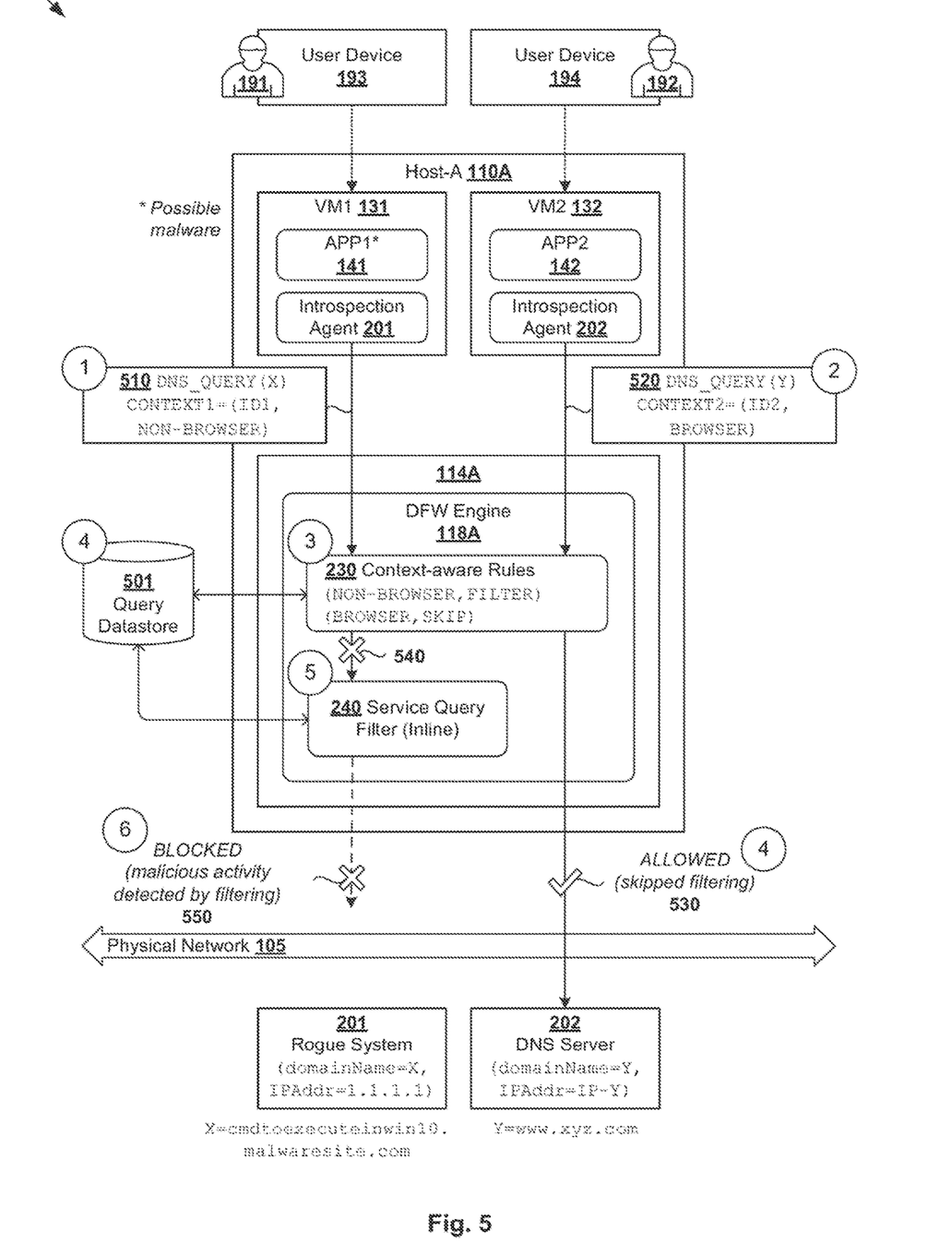
FIG. 5 is a schematic diagram illustrating a first example of context-aware service query filtering according to an inline approach.

In the example in FIG. 5, first guest introspection agent 201 executing on guest OS 151 may detect first DNS query 510 originating from APP1 141 on VM1 131. First DNS query 510 is a request to translate or resolve a domain name (e.g., X=cmdtoexecuteinwin10.malwaresite.com) into a routable IP address. In response, guest introspection agent 201 may collect and tag first DNS query 510 with first context information=CONTEXT1, such as (application ID=ID1, application type=non-browser) associated with APP1 141.

In another example, second guest introspection agent 202 executing on guest OS 152 may detect second DNS query 520 from APP2 142 on VM2 132. Second DNS query 520 is to request for a translation of a domain name (e.g., Y=www.xyz.com) to a routable IP address. In response, guest introspection agent 202 may collect and tag second DNS query 520 with second context information=CONTEXT2, such as (application ID=ID2, application type=browser) associated with APP2 142. CONTEXT2 may also specify the specific browser (i.e., APP2 142) that generates second DNS query 520.

Context-Aware Rules

At 420 and 430 in FIG. 4, in response to intercepting DNS query 510/520 from VM 131/132 to pause forwarding of DNS query 510/520, DFW engine 118A may obtain context information associated with application 141/142. For example, CONTEXT1=(ID1, non-browser) may be extracted from a tag in first DNS query 510 from APP1 141, and CONTEXT2=(ID2, browser) from a tag in second DNS query 520 from APP2 142.

At 440 in FIG. 4, DNS query 510/520 may also be stored in a datastore (see 501 in FIG. 5) that is accessible by network administrator(s) for monitoring purposes. DNS query 510/520 may be stored in datastore 501 along with associated context information, statistics, etc. Where applicable, DNS query 510/520 may also be stored along with any outcome of service query filtering (to be performed at block 480 below) for monitoring purposes.

At 450 in FIG. 4, DFW engine 118A may apply context-aware rule(s) to determine whether DNS query 510/520 is a potential security threat. Each context-aware rule may specify (1) context information to be matched and (2) an action (e.g., filter or skip) to be performed when there is a match. In the example in FIG. 5, context-aware rules 230 may be configured to skip filtering for DNS queries generated by a browser application (e.g., Chrome™ browser, a trademark of Google LLC), while filtering those from non-browser applications.

At 460 (no) and 470 in FIG. 4, DFW engine 118A may apply a context-aware rule specifying (application type=browser, action=skip) to determine that there is no potential security threat and skip filtering for second DNS query 520 from APP2 142. In this case, second DNS query 520 is forwarded towards destination=DNS server 202 that is capable of resolving domain name=www.xyz.com into a routable IP address. See also 530 in FIG. 5.

In practice, one problem with DNS query filtering is that it requires a lot of processing resources and can introduce delays in, or possibly stall, application data processing. In a typical browser, for example, there might be tens of DNS requests for a single page load. Processing each and every query will significantly increase the page load time, which affects the usability of web applications and degrades user experience. Instead of bombarding service query filter 240 with a large number of DNS queries, selective filtering may be performed to reduce the filtering workload at DFW engine 118A. It should be noted that context-aware rules 230 may be configured to be matched with any suitable application type. Besides browser applications, some cloud-based applications might also generate a large number of DNS queries.

Selective Filtering

At 460 (yes) in FIG. 4, DFW engine 118A may apply a context-aware rule specifying (application type=non-browser, action=filter) to determine that there is a potential security threat associated with first DNS query 510 from APP1 141. In this case, at 480, service query filter 240 may further inspect first DNS query 510 for malicious activity according to an inline approach (see 481), offline approach (see 482), or a combination of both.

In both approaches, the filtering at block 480 may involve deep packet inspection (DPI) for malicious activity, such as based on whois information for the domain name (e.g., X=cmdtoexecuteinwin10.malwaresite.com) in first DNS query 510. For example, the whois information may include contact information associated with a domain name registrant, registration date(s), name server(s), most-recent update, expiration date, etc.

Based on the whois information, a DNS policy may be configured to only allow DNS queries for a domain name that has existed for more than a predetermined period of time (e.g., six months). Alternatively or additionally, the DNS policy may only allow DNS queries for a domain name that has properly-backed identity information (i.e., non-anonymous). The inline and offline approaches will be discussed below.

(a) Inline Approach

An example inline approach is shown in FIG. 5. In this case, service query filtering may be performed by filter 240 implemented by DFW engine 118A to inspect first DNS query 510 for malicious activity. If malicious activity is not detected, first DNS query 510 may be forwarded towards destination 201. Otherwise, first DNS query 510 will be blocked and dropped. See 550 in FIG. 5.

Further, any suitable remediation action(s) may be performed according to block 490 in FIG. 4. For example, DFW engine 118A may send an alarm or notification message to inform SDN controller 180 of first DNS query 510 and associated malicious activity. SDN controller 180 and/or SDN manager 184 may then send an alert to a user (e.g., network administrator) to facilitate monitoring and troubleshooting. Depending on the desired implementation, SDN controller 180 may instruct host-A 110A to terminate APP1 141 and/or isolate VM1 131 temporarily. To assess whether other processes on VM1 131 are infected, additional forensic analysis may be performed.

The inline approach ensures that only DNS queries that have been inspected are forwarded towards their respective destinations. However, in practice, this introduces delay in DNS query processing. Since there might be a large number of DNS queries generated by VMs 131/132 on host-A 110A, intercepting and delaying those DNS queries (including non-malicious ones) may lead to some applications being unresponsive. To alleviate this issue, DFW engine 118A may perform service query filtering offline at a later time. This way, validation may be implemented offline while allowing DNS requests and responses temporarily.

(b) Offline Approach

Figure 6:
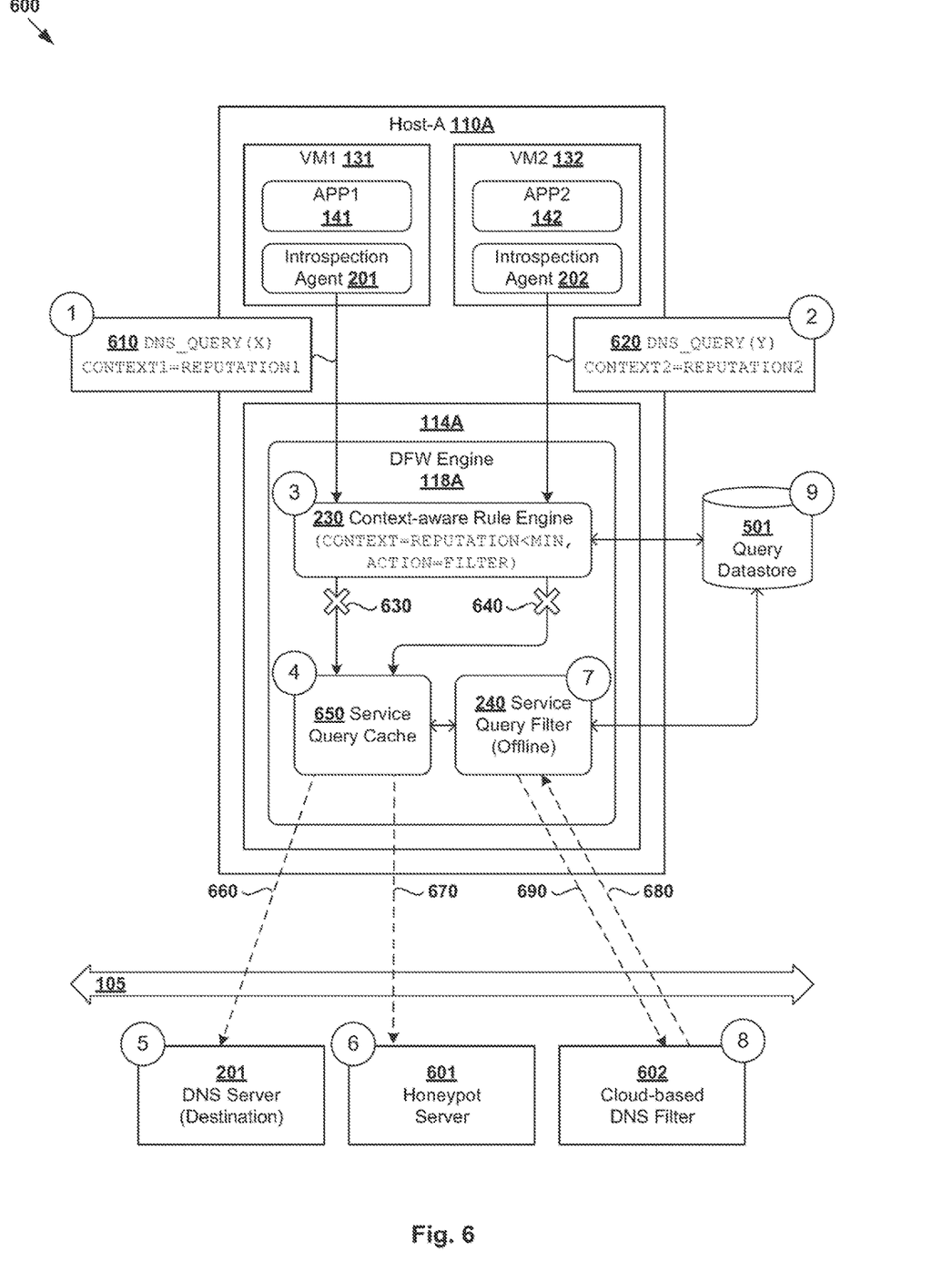
FIG. 6 is a schematic diagram illustrating a second example of context-aware service query filtering according to an offline approach.

An example offline approach is shown in FIG. 6, which is a schematic diagram illustrating second example 600 of context-aware service query filtering according to an offline approach. At 610 in FIG. 6, in response to intercepting first DNS query 610 from VM1 131, DFW engine 118A may determine whether there is a potential security threat based on CONTEXT1=reputation information (REPUTATION1) associated with APP1 141. Similarly, at 620, in response to intercepting second DNS query 610 from VM1 131, DFW engine 118A may determine whether there is a potential security threat based on CONTEXT2=reputation information (REPUTATION2) associated with APP1 142. The reputation information may be collected by guest introspection agent 201/202 from an antivirus agent (not shown) running on VM 131/132.

At 630 and 640 in FIG. 6, DFW engine 118A may apply context-aware rule(s) based on CONTEXT1=REPUTATION1 in first DNS query 610 from APP1 141 and CONTEXT2=REPUTATION2 in second DNS query 620 from APP2 142. For example, a matching context-aware rule may specify a minimum reputation score to skip filtering. In this case, since the minimum reputation score is not reached, both first DNS query 610 and second DNS query 620 are determined to be potential security threat.

At 650 in FIG. 6, DFW engine 118A may store first DNS query 610 and second DNS query 620 in a service query cache. In practice, DNS queries may be cached across different VMs based on application information, related OS information such as Windows®, Linux® (a registered trademark of Linus Torvalds), etc. This way, prior to performing service query filtering, DNS query 610/620 may be forwarded without substantial delay compared to the inline approach in FIG. 5.

At 660 in FIG. 6, DFW engine 118A may forward first DNS query 610 towards a destination (see 201) specified by first DNS query 610. In another example, at 670, second DNS query 620 may be forwarded or redirected towards a honeypot server (see 601) capable of mimicking a behavior of its destination. Depending on the desired implementation, honeypot server 601 may be configured to process second DNS query 620 and interact with APP1 141, such as with the aim of indulging and learning more about an attacker's strategy.

At 680 in FIG. 6, DFW engine 118A may perform service query filtering offline for a batch of cached DNS queries stored in cache 650. This may involve interacting with a cloud-based filter (see 602) capable of inspecting the cached DNS queries for malicious activity. This way, each cached DNS query may be inspected by cloud-based filter 602 at a later time without substantially stalling applications 141-142 due to the delay in service query filtering.

At 690 in FIG. 6, based on a response from cloud-based filter 602, DFW engine 118A may determine whether first DNS query 610 and second DNS query 620 are associated with malicious activity. If yes, remediation action(s) may be performed, such as generating and sending an alert to network administrator(s) via management entity 180/184. Host-A 110A may also terminate APP 141/142 and/or isolate VM 131/132 temporarily.

Similar to the example in FIG. 5, information associated with first DNS query 610 and second DNS query 620 may be stored in query datastore 501 for later access by the network administrator(s). Each DNS query 610/620 may be logged along with any suitable context information and filtering outcome (i.e., malicious activity detected or otherwise). The information stored in query datastore 501 may be analyzed, such as to generate an alert when a new DNS query is seen for a particular application compared to its previous version, etc.

Using examples of the present disclosure, context-aware service query filtering may be implemented to reduce the likelihood of a malicious attacker launching a command and control response over DNS for sunburst attacks. Further, selective filtering using context-aware rule(s) may significantly reduce the number of DNS queries that require further inspection at DFW engine 118A.

Name Queries

Examples of the present disclosure may be implemented to intercept and selectively filter any suitable service queries that may be used to launch a malicious attack. Besides DNS queries, additional examples will be discussed below with reference to FIG. 7, which is a schematic diagram illustrating third example 700 of context-aware service query filtering. Note implementation details discussed using FIGS. 1-6 are also applicable below. These details will not be repeated here for brevity.

(a) NetBIOS Name Query

On TCP/IP networks, NetBIOS name resolution refers to the process of resolving a NetBIOS name of a host computer system to an IP address. The name resolution process enables NetBIOS hosts to communicate with each other using TCP/IP. In the example in FIG. 7, DFW engine 118A may intercept a service query=NetBIOS name resolution request and determine whether there is a potential security threat based on context information (e.g., CONTEXT1). If yes, inline or offline filtering may be performed to inspect the NetBIOS name resolution request for malicious activity. Otherwise, filtering may be skipped. See 710 (O1) and 750 in FIG. 7.

(b) Link-Local Multicast Name Resolution (LLMNR) Query

LLMNR is a protocol based on the DNS packet format that allows hosts to perform name resolution for hosts on the same local link. For example, LLMNR is supported by the Windows Vista™ (a trademark of Microsoft Corporation) operating system and above to resolve name within the same link of a switch using LLMNR when DNS fails to resolve a given name. If there are malware-infected machines behind the same link, both machines may use LLMNR name request and response to communicate messages with each other.

Figure 7:
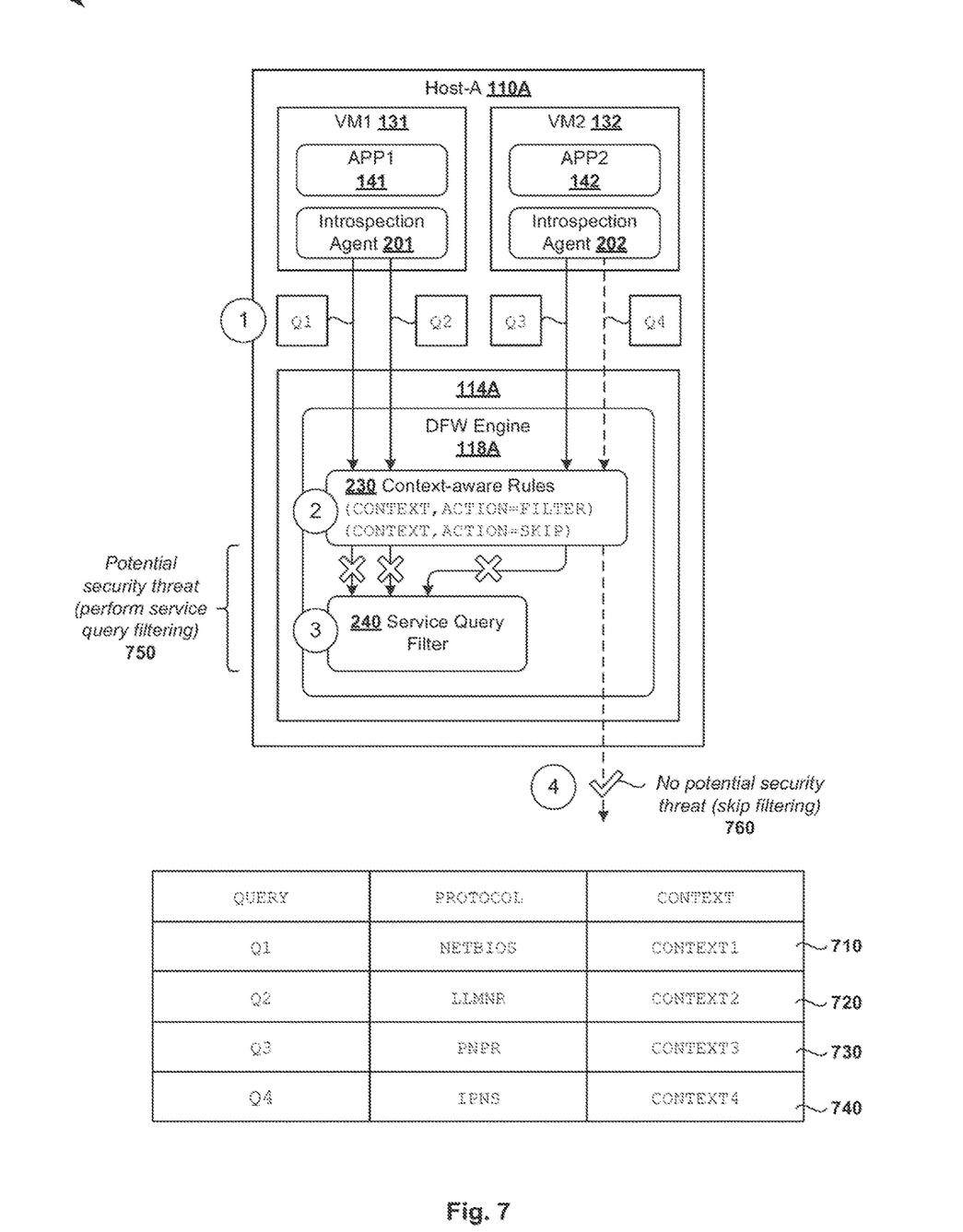
FIG. 7 is a schematic diagram illustrating a third example of context-aware service query filtering.

In the example in FIG. 7, such malicious activity may be detected using DFW engine 118A to intercept LLMNR packets and determine whether there is a potential security threat based on context information (e.g., CONTEXT2). If yes, inline or offline filtering may be performed to inspect the LLMNR packets. Otherwise, filtering may be skipped. See 720 (Q2) and 750 in FIG. 7.

(c) Peer Name Resolution Protocol (PNRP) Query

PNRP is a decentralized naming system protocol where there is no centralized server for name resolution. Using PNRP, any participating machine in the mesh may publish name and address/data for a given name. Other machines may send name request to the nearest neighbors. In practice, Microsoft Windows by default supports name resolution using PNRP. This naming scheme may be used for tunneling messages by malware publishing the name and resolving it in target machine. In this case, the source of the publisher may remain anonymous as the name information is passed to other peers in the mesh.

In the example in FIG. 7, such malicious activity may be detected using DFW engine 118A to intercept PNPR packets and determine whether there is a potential security threat based on context information (e.g., CONTEXT3). If yes, inline or offline filtering may be performed to inspect the PNPR packets. Otherwise, filtering may be skipped. See 730 (Q3) and 750 in FIG. 7.

(d) InterPlanetary Name System (IPNS) Query

IPNS is similar to PNRP and concerns decentralized naming systems. This name resolution approach is supported by some browsers. Similarly, name request and content publisher can remain anonymous. In the future, IPNS may be exploited by malware for request tunneling over name request. Using examples of the present disclosure, such malicious activity may be detected using DFW engine 118A to intercept IPNS packets and determine whether there is a potential security threat based on context information (e.g., CONTEXT4). If yes, inline or offline filtering may be performed to inspect the IPNS packets. Otherwise, filtering may be skipped. See 740 (Q4) and 760 in FIG. 7.

Container Implementation

Although explained using VMs, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 7, container technologies may be used to run various containers inside respective VMs 131-134. Containers are "OS-less", meaning that they do not include any OS that could weigh 10 s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 7. For example, the instructions or program code, when executed by the processor of the computer system, may cause the processor to implement examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described or can be alternatively located in one or more devices different from that in the examples. The units in the examples described can be combined into one module or further divided into a plurality of sub-units.

What is claimed is:

1. A method, comprising:
   intercepting a service query from a virtualized computing instance supported by the computer system to pause forwarding of the service query towards a destination;
   obtaining, from a guest introspection agent running on a guest operating system of the virtualized computing instance, context information collected by the guest introspection agent and associated with an application, wherein the service query originates from the application running on the virtualized computing instance and the context information comprises information additional to an identity of the application; and
   in response to determination that the service query is a potential security threat based on the context information, performing service query filtering to inspect the service query for malicious activity;
   otherwise, in response to determination that the service query is not a potential security threat based on the context information, skipping the service query filtering and allowing forwarding of the service query towards the destination.

2. The method of claim 1, wherein performing the service query filtering comprises:
   in response to detecting a malicious activity during service query filtering, blocking forwarding of the service query towards the destination;
   otherwise, allowing forwarding of the service query towards the destination.

3. The method of claim 1, wherein performing the service query filtering comprises:
   caching the service query prior to performing service query filtering on a batch of multiple cached service queries.

4. The method of claim 3, wherein performing the service query filtering comprises:
   prior to performing the service query filtering, forwarding the service query towards (a) the destination, or (b) a honeypot server that is capable of mimicking a service query handling behavior of the destination.

5. The method of claim 1, wherein the determination that the service query is, or is not, a potential security threat comprises:
   applying one or more context-aware rules on the service query based on the context information that includes at least one of the following: (a) application information associated with the application; (b) user information associated with a user operating the virtualized computing instance via a user device; (c) hardware information associated with the application or user device; (d) software information associated with the application or user device; and (e) reputation information associated with the application.

6. The method of claim 1, wherein the method further comprises at least one of the following:
   storing, in a datastore, information associated with the service query for access by a network administrator; and
   in response to detecting a malicious activity associated with the service query using the service query filtering, generating and sending an alert to a network administrator.

7. The method of claim 1, wherein performing the service query filtering comprises inspecting one of the following service queries:
   domain name system (DNS) query;
   NetBIOS name query;
   Link-Local Multicast Name Resolution (LLMNR) query;
   Peer Name Resolution Protocol (PNRP) query; and
   InterPlanetary Name System (IPNS) query.

8. A non-transitory computer-readable storage medium that includes a set of instructions which, in response to execution by a processor of a computer system, cause the computer to perform operations comprising:
   intercepting a service query from a virtualized computing instance supported by the computer system to pause forwarding of the service query towards a destination;
   obtaining, from a guest introspection agent running on a guest operating system of the virtualized computing instance, context information collected by the guest introspection agent and associated with an application, wherein the service query originates from the application running on the virtualized computing instance and the context information comprises information additional to an identity of the application; and in response to determination that the service query is a potential security threat based on the context information, performing service query filtering to inspect the service query for malicious activity;

otherwise, in response to determination that the service query is not a potential security threat based on the context information, skipping the service query filtering and allowing forwarding of the service query towards the destination.

9. The non-transitory computer-readable storage medium of claim 8, wherein performing the service query filtering comprises:

in response to detecting a malicious activity during service query filtering, blocking forwarding of the service query towards the destination;

otherwise, allowing forwarding of the service query towards the destination.

10. The non-transitory computer-readable storage medium of claim 8, wherein performing the service query filtering comprises:

caching the service query prior to performing service query filtering on a batch of multiple cached service queries.

11. The non-transitory computer-readable storage medium of claim 10, wherein performing the service query filtering comprises:

prior to performing the service query filtering, forwarding the service query towards (a) the destination, or (b) a honeypot server that is capable of mimicking a service query handling behavior of the destination.

12. The non-transitory computer-readable storage medium of claim 8, wherein the determination that the service query is, or is not, a potential security threat comprises:

applying one or more context-aware rules on the service query based on the context information that includes at least one of the following: (a) application information associated with the application; (b) user information associated with a user operating the virtualized computing instance via a user device; (c) hardware information associated with the application or user device; (d) software information associated with the application or user device; and (e) reputation information associated with the application.

13. The non-transitory computer-readable storage medium of claim 8, wherein the method further comprises at least one of the following:

storing, in a datastore, information associated with the service query for access by a network administrator; and in response to detecting a malicious activity associated with the service query using the service query filtering, generating and sending an alert to a network administrator.

14. The non-transitory computer-readable storage medium of claim 8, wherein performing the service query filtering comprises inspecting one of the following service queries:

domain name system (DNS) query;
NetBIOS name query;
Link-Local Multicast Name Resolution (LLMNR) query;
Peer Name Resolution Protocol (PNRP) query; and
InterPlanetary Name System (IPNS) query.

15. A computer system, comprising:

one or more processors; and a non-transitory computer-readable storage medium that includes a set of instructions which, in response to execution by the one or more processors, cause the computer system to perform operations comprising:

intercepting a service query from a virtualized computing instance supported by the computer system to pause forwarding of the service query towards a destination;

obtaining, from a guest introspection agent running on a guest operating system of the virtualized computing instance, context information collected by the guest introspection agent and associated with an application, wherein the service query originates from the application running on the virtualized computing instance and the context information comprises information additional to an identity of the application; and in response to determination that the service query is a potential security threat based on the context information, performing service query filtering to inspect the service query for malicious activity;

otherwise, in response to determination that the service query is not a potential security threat based on the context information, skipping the service query filtering and allowing forwarding of the service query towards the destination.

16. The computer system of claim 15, wherein performing the service query filtering comprises:

in response to detecting a malicious activity during service query filtering, block forwarding of the service query towards the destination;

otherwise, allow forwarding of the service query towards the destination.

17. The computer system of claim 15, wherein performing the service query filtering comprises:

cache the service query prior to performing service query filtering on a batch of multiple cached service queries.

18. The computer system of claim 17, wherein performing the service query filtering comprises:

prior to performing the service query filtering, forward the service query towards (a) the destination, or (b) a honeypot server that is capable of mimicking a service query handling behavior of the destination.

19. The computer system of claim 15, wherein the determination that the service query is, or is not, a potential security threat comprises:

apply one or more context-aware rules on the service query based on the context information that includes at least one of the following: (a) application information associated with the application; (b) user information associated with a user operating the virtualized computing instance via a user device; (c) hardware information associated with the application or user device; (d) software information associated with the application or user device; and (e) reputation information associated with the application.

20. The computer system of claim 15, wherein the operations further comprise at least one of the following:

store, in a datastore, information associated with the service query for access by a network administrator; or in response to detecting a malicious activity associated with the service query using the service query filtering, generate and send an alert to a network administrator.

21. The computer system of claim 15, wherein
domain name system (DNS) query;
NetBIOS name query;
Link-Local Multicast Name Resolution (LLMNR) query;
Peer Name Resolution Protocol (PNRP) query; and
InterPlanetary Name System (IPNS) query.

* * * * *